US009660492B2

(12) United States Patent
Lemma

(10) Patent No.: US 9,660,492 B2
(45) Date of Patent: May 23, 2017

(54) OUTER ROTOR CONSTRUCTION

(71) Applicant: SIEMENS AKTIENGESELLSCHAFT, München (DE)

(72) Inventor: Edom Lemma, Vejle (DK)

(73) Assignee: SIEMENS AKTIENGESELLSCHAFT (DE)

( * ) Notice: Subject to any disclaimer, the term of this patent is extended or adjusted under 35 U.S.C. 154(b) by 284 days.

(21) Appl. No.: 14/569,814

(22) Filed: Dec. 15, 2014

(65) Prior Publication Data
US 2015/0288232 A1 Oct. 8, 2015

(30) Foreign Application Priority Data

Apr. 7, 2014 (EP) ..................... 14163660

(51) Int. Cl.
H02P 9/04 (2006.01)
H02K 5/00 (2006.01)
H02K 1/27 (2006.01)
F03D 9/00 (2016.01)
H02K 7/18 (2006.01)
H02K 15/03 (2006.01)

(52) U.S. Cl.
CPC ........... *H02K 1/2786* (2013.01); *F03D 9/002* (2013.01); *H02K 7/1838* (2013.01); *H02K 15/03* (2013.01); *H02K 2213/12* (2013.01); *Y02E 10/725* (2013.01); *Y10T 29/49012* (2015.01)

(58) Field of Classification Search
CPC ...... H02K 7/1838; H02K 7/183; F03D 9/002; F03D 13/20

USPC ................ 310/89, 156.01–156.84, 402–413; 290/55, 44

See application file for complete search history.

(56) References Cited

U.S. PATENT DOCUMENTS

| 1,043,047 | A | 10/1912 | Goldschmidt | |
| 9,482,283 | B2 * | 11/2016 | Eriksen | F03D 9/002 |
| 2005/0099080 | A1 * | 5/2005 | Matsumoto | H02K 1/02 310/156.26 |
| 2009/0015020 | A1 * | 1/2009 | Stiesdal | F03D 9/002 290/55 |
| 2009/0218900 | A1 | 9/2009 | Dickes | |
| 2011/0135478 | A1 | 6/2011 | Christensen | |

(Continued)

OTHER PUBLICATIONS

Extended European Search Report; Application No. 14163660.5; 8 pgs.

*Primary Examiner* — Thanh Lam

(74) *Attorney, Agent, or Firm* — Schmeiser Olsen & Watts LLP

(57) ABSTRACT

An outer rotor construction for a wind turbine generator which outer rotor construction comprises a plurality of rotor housing segments, wherein a rotor housing segment is realized to hold a number of magnet poles, and wherein a rotor housing segment comprises a lateral connecting interface of a lateral connection for detachably connecting that rotor housing segment along its longitudinal length to a number of adjacent rotor housing segments. The invention further describes a wind turbine including a generator, which generator includes an inner stator and such an outer rotor is provided. A method of performing a maintenance procedure on such an outer rotor construction is also provided.

17 Claims, 3 Drawing Sheets

(56) References Cited

U.S. PATENT DOCUMENTS

| | | | |
|---|---|---|---|
| 2012/0030920 A1* | 2/2012 | Lange | F03D 9/002 |
| | | | 29/428 |
| 2012/0049684 A1* | 3/2012 | Bodenstein | F03D 9/002 |
| | | | 310/156.12 |
| 2012/0181792 A1 | 7/2012 | Pettersen | |
| 2013/0285499 A1 | 10/2013 | Thomas | |
| 2014/0009014 A1* | 1/2014 | Scuotto | H02K 9/10 |
| | | | 310/55 |
| 2014/0132004 A1 | 5/2014 | Muniz Casais | |
| 2014/0133985 A1* | 5/2014 | Mongeau | F03D 9/002 |
| | | | 416/95 |

\* cited by examiner

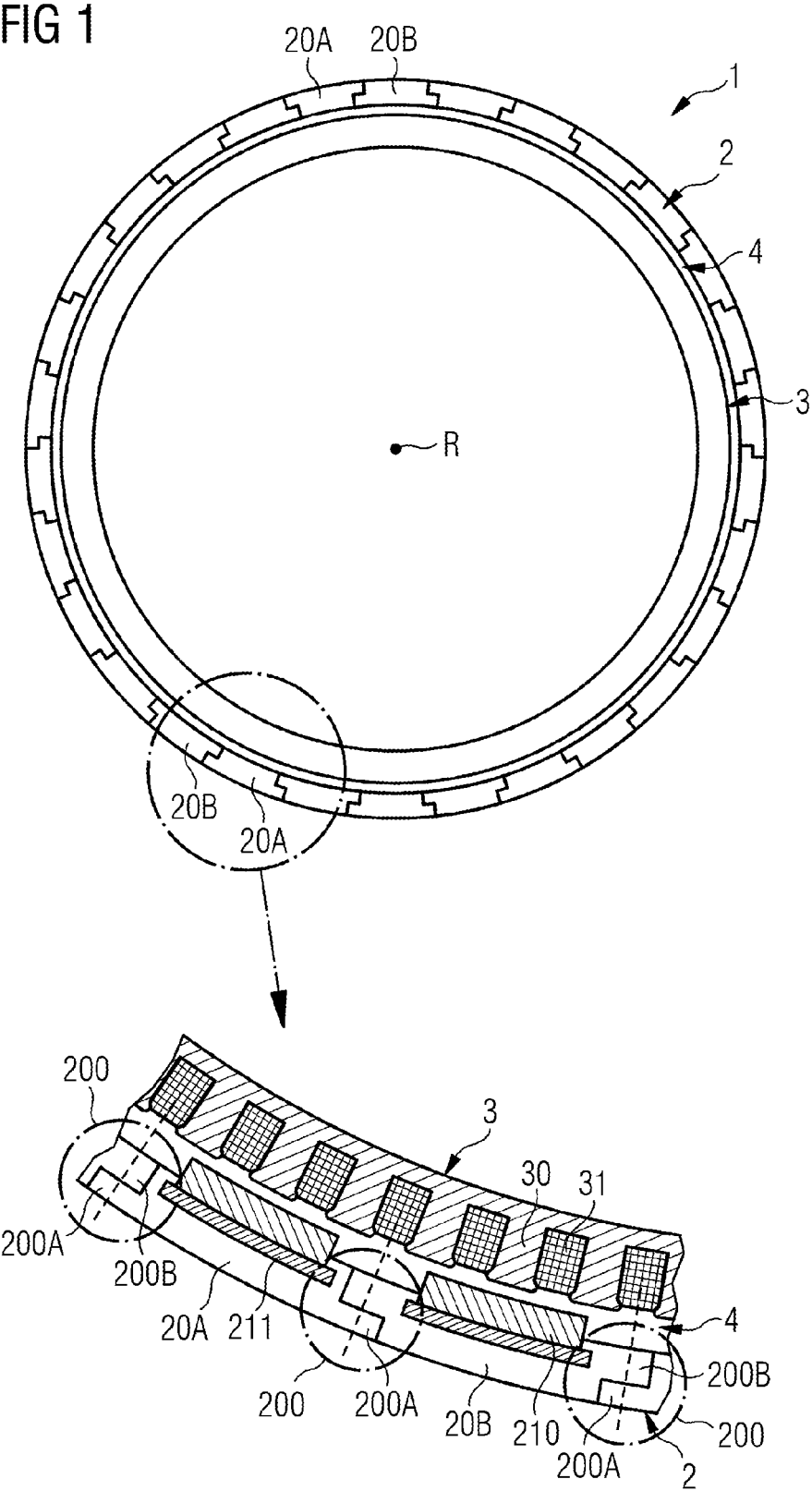

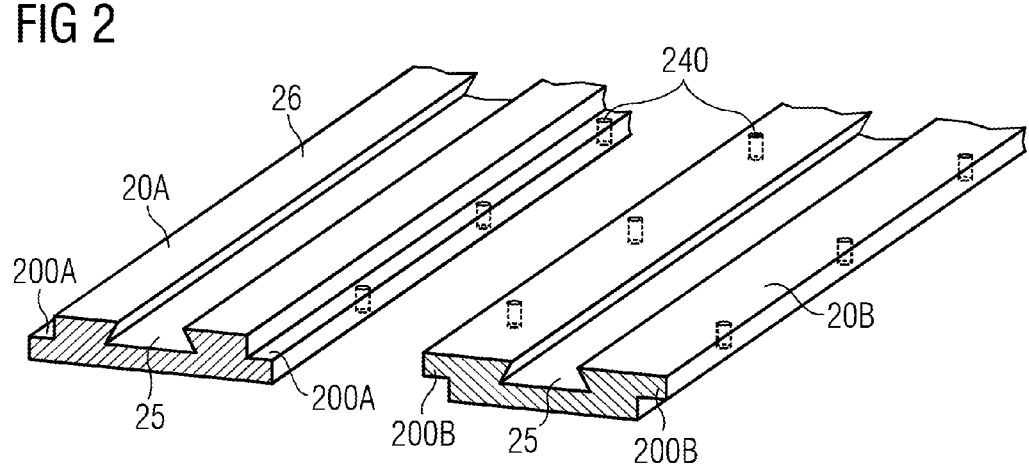
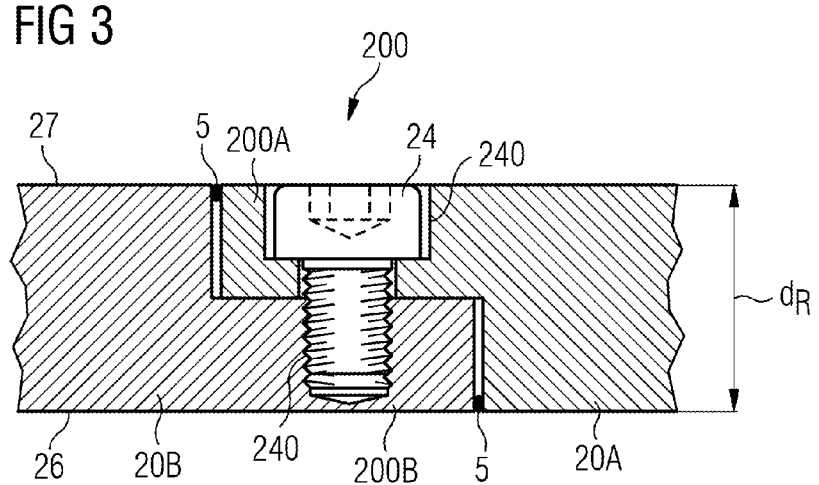

OUTER ROTOR CONSTRUCTION

CROSS-REFERENCE TO RELATED APPLICATION

This application claims priority to EP 14163660.5, having a filing date of Apr. 7, 2014, the entire contents of which are hereby incorporated by reference.

FIELD OF TECHNOLOGY

The following describes an outer rotor construction for the generator of a wind turbine; a wind turbine; and a method of performing maintenance on such an outer rotor construction.

BACKGROUND

In an 'outer rotor' design of an electrical machine such as a generator, the rotor is free to rotate about the inner stator. The rotor housing of an outer rotor, such as used in a direct-drive generator, is generally made from a rolled and welded steel barrel. The complexity and cost of machining of such a rotor housing increase with rotor size. Custom machines must be built to be able to handle large outer rotors, and much effort must be invested in ensuring that the heavy but relatively thin-walled rotor does not become distorted during handling. Such distortion or ovalization is very difficult to avoid if the rotor housing is made as a one-piece barrel, especially since some generator assembly steps are carried out with the rotor in a 'horizontal' position, i.e. with its axis of rotation in a horizontal alignment. The own weight of the rotor may cause it to become distorted in that position before a structural element such as a front plate can be secured in a final assembly step.

Another problem associated with such outer rotor designs is the difficulty in accessing and replacing a defective magnet pole or pole piece. In the known designs, it may be necessary to disassemble the entire back plate or brake disc of the generator in order to be able to remove the defective magnet. Such a maintenance procedure is lengthy and costly, and the generator down time may be considerable.

Another problem that can be encountered with such rotor designs is that of an uneven air-gap. This can only be dealt with to a limited extent, for example by adjusting the position of one of several stator segments. A stator segment is a portion of the cylindrical stator, for example one-twelfth, and generally carries a plurality of windings arranged between stator teeth, and mounted to a carrier structure or bedframe. Since a stator segment generally covers several magnet poles, for example in a ratio of 1:8 or more, it may be difficult or impossible to correct a local air-gap inconsistency (relating to only one or two magnet poles) by adjusting the position of one stator segment.

SUMMARY

An aspect relates to an improved rotor construction for a generator.

According to the aspect, the outer rotor construction for a wind turbine comprises a plurality of rotor housing segments, wherein a rotor housing segment is realized to hold a number of magnet poles, and wherein each rotor housing segment comprises a lateral connecting interface for detachably connecting that rotor housing segment along its longitudinal length to adjacent rotor housing segments.

An advantage of the outer rotor construction according to embodiments of the invention is that a rotor housing segment is detachably connected to its neighboring rotor housing segments, so that a removal of a rotor housing segment is possible whenever necessary. In the event of the failure of a magnet pole or a magnet pole piece, the defective rotor housing segment can be removed in a fairly straightforward procedure, so that a replacement rotor housing segment can be installed in its place, or the defective magnet pole or pole piece can be replaced before reconnecting the rotor housing segment to the outer rotor construction. Particularly in the case of an offshore wind turbine, such ease of access to a defective component is a significant advantage, since the wind turbine's downtime can be kept to a minimum, and the maintenance costs can also be favorably reduced.

Since each rotor housing segment of the outer rotor construction according to embodiments of the invention is realized to hold a number of magnet poles, the outer rotor construction has the appearance of a barrel, an essentially straight-walled cylindrical shape, and may be referred to in the following as a "rotor barrel". Each rotor housing segment might be regarded as a stave of such a barrel, since each rotor housing segment has two "long" sides corresponding to the length of the outer rotor. Here and in the following, the terms "rotor housing segment" and "rotor housing section" may be understood to have the same meaning and may be used interchangeably.

According to embodiments of the invention, the wind turbine comprises a generator, which generator comprises an inner stator and an outer rotor construction according to embodiments of the invention.

An advantage of the wind turbine according to embodiments of the invention is that any defective magnet pole or magnet pole piece, or other defect involving a rotor component, can be dealt with in a relatively straightforward an uncomplicated manner, so that the defect can be repaired quickly. In this way, a downtime of the wind turbine, arising for example from a defective magnet pole or pole piece, can be kept to a favorable minimum.

According to embodiments of the invention, the method of performing a maintenance procedure on an outer rotor construction according to embodiments of the invention comprises the steps of detaching a rotor housing segment from its adjacent rotor housing sections; lifting the detached rotor housing segment out of the outer rotor to leave a gap; lowering a replacement rotor housing segment into the gap; and securing the replacement rotor housing segment to the adjacent rotor housing segment.

An advantage of the method according to embodiments of the invention is that the method steps can be carried out in situ without having to disassemble large portions of the generator. Access to a defective rotor component is from the outside, in contrast to former constructions which entail dismantling the brake disc in order to be able to access a defective magnet pole piece.

Particularly advantageous embodiments and features of embodiments of the invention are given by the dependent claims, as revealed in the following description. Features of different claim categories may be combined as appropriate to give further embodiments not described herein.

In the following, without restricting embodiments of the invention in any way, it may be assumed that the generator is for a direct-drive wind turbine, and it may also be assumed that the outer rotor is the field of the generator and bears permanent magnet poles, whereby a magnet pole can be a single magnet, or can comprise a row of magnet pole pieces. The inventive outer rotor construction can be used for any electric machine design with a field that bears permanent magnets, regardless of whether the electrical machine is direct driven or comprises a gearbox. The outer rotor construction according to embodiments of the invention is particularly well suited to larger rotors, for example an outer rotor of a direct-drive generator of an offshore wind turbine.

To this end, a rotor housing segment of the outer rotor preferably comprises a pole holding means for holding one or more magnet poles. For example, the pole holding means may comprise a T-shaped slot realized to accommodate a base plate of a magnet pole piece; so that such a pole piece can be pushed along the slot until it reaches its designated position. In a 3 MW (megawatt) direct-drive generator, the outer rotor may comprise 100-140 such magnet poles, each with 4-6 pole pieces. In the event of failure, the outer rotor construction according to embodiments of the invention allows a magnet pole piece to be relatively easily removed by first lifting out the appropriate rotor housing section, and then sliding the magnet pole piece(s) out of the slot and replacing the defective magnet pole piece(s).

A canopy is generally used to protect various parts of the wind turbine. For example, the canopy can be shaped to fit over the tower head so that a yaw mechanism is enclosed and protected from rain and dust. In the following, it may be assumed that the generator is arranged between a hub and the canopy, which generally refers to a shell or housing that protects the components enclosed by it from the surroundings. The canopy, a supporting frame such as a bed frame and a yawing mechanism may be referred to collectively as a 'nacelle'. A seal such as a labyrinth seal can be arranged between the generator and the canopy to allow the rotor to rotate while preventing moisture from entering the canopy.

The lateral connecting interfaces can be realized in any suitable way. Preferably, however, the lateral connecting interfaces are realized to form a mated connection between a first rotor housing section and an adjacent second rotor housing section. In other words, a mated connection comprises complementary shaped connecting interfaces of the adjacent rotor housing segments. Preferably, the complementary connecting interface portions for the mated connection are realized to mate over their entire length, e.g. over the length of the rotor housing when a lateral interface extends from the front to the rear of the rotor housing. Preferably, a mated interface has a thickness no greater than a maximum thickness of a rotor housing segment.

The mated interface or connection between two adjacent rotor housing segments can be realized in any suitable manner, for example using a dovetail joint or other suitable toothed joint. However, such a joint may be relatively expensive to realize since it may require precision machining on a large number of rotor housing segments. Therefore, in a particularly preferred embodiment of the invention, the lateral connecting interface comprises an outer flange of the first rotor housing segment and a complementary inner flange of the second rotor housing segment. Preferably, at least one of the complementary flanges extends along essentially the entire length of a rotor housing segment, i.e. a flange extends along the portion of the rotor housing segment between a front end and a rear end. Preferably, both flanges extend along the length of a rotor housing segment.

A mated interface comprising such complementary flanges can be secured as appropriate. A pair of flanges can be bolted or otherwise connected at a number of points along the length of the lateral connecting interface. In a preferred embodiment of the invention, a lateral connecting interface comprises a plurality of fasteners realized to secure a rotor housing segment to an adjacent rotor housing segment. For example, in the case of an outer rotor with a diameter of about 4 m and a length (from hub end to rear end) in the range of 1600 cm, about 5-7 fasteners may be used to connect the complementary flanges of each lateral connection. A fastener is preferably a socket-head bolt, and the flanges are preferably prepared with an inner thread and a bore to accommodate the bolt head. Preferably, such a fastener has an overall length that does not exceed the combined height of the flange connection, so that no part of the fastener protrudes from the body of the rotor once it has been tightened.

The magnet poles of a generator field can be arranged in rows of magnet pole pieces, where each row is essentially parallel to the axis of rotation of the generator. In a preferred embodiment of the invention, therefore, a rotor housing segment is aligned with the axis of rotation of the generator. However, in some generator designs, the magnet pole pieces may be arranged in a staggered or pole-shifted fashion, for example in order to reduce cogging torque. To this end, a holding slot for the magnet pole pieces may be machined so that a common axis of the pole pieces is at a slight angle relative to the axis of rotation. A segmented rotor housing for such a design may therefore be based on slanted rotor housing segments.

A rotor housing segment may be realized to accommodate one or more magnet poles. Therefore, in a preferred embodiment of the invention, the outer rotor comprises at least 100 rotor housing sections. The number of rotor housing segments may be chosen according to various relevant factors such as the dimensions of the outer rotor, the number of magnet poles to be accommodated, etc.

In a direct-drive generator, the rotor will have a front end, also referred to as the drive end, since the hub (to which the blades are attached) is connected to the rotor at this end. For stability of the outer rotor, and to protect the components in the interior of the generator, the drive end of the generator is preferably closed off by a front plate, which can be flat or conical, or can have any appropriate shape. The opposite end of the rotor is the rear or non-drive end. Usually, a brake plate and braking mechanism are arranged at the non-drive end. The brake plate may also be referred to as a back plate. Therefore, in a further preferred embodiment of the invention, a rotor housing segment comprises an anterior or front plate connecting interface for securing that rotor housing segment to a rotor front plate and/or a posterior or back plate connecting interface for connecting that rotor housing segment to a rotor back plate. These connecting interfaces may also be realized using an arrangement of complementary flanges as described above. Alternatively, a front or back plate connecting interface may comprise a single flange shaped to fit over an edge of the front or back plate, respectively. Here also, the front and back plate connecting interfaces can be secured to the front and back plates using any suitable confleeting means, for example by using a number of socket-head bolts or screws as described above. Preferably, these fasteners also do not protrude above the outer surface of the rotor. As indicated above, it is preferable to keep moisture and air-borne particles out of the interior of the generator, since the environment inside the generator should be as clean and as dry as possible. Therefore, in a further preferred embodiment of the invention, a connecting interface can be realized to enclose a seal to prevent moisture from bypassing or penetrating the connecting interface. A seal can be realized in any appropriate way. For example, a thin strip of rubber or silicone can be applied along an inner face of a flange of a connecting interface, so that the seal prevents air and moisture from passing the connecting interface when the flanges are connected. Alternatively, the rotor housing sections can be machined to obtain a close fit that may be sufficient to keep out air-borne particles. The outer rotor construction may be enclosed by a shroud or other cover that prevents moisture and particles from entering the rotor through any gaps between adjacent rotor housing sections.

As indicated in the introduction, a large outer rotor can present a challenge in meeting the strict requirements for an even air-gap between the rotor and the stator. Therefore, in a preferred embodiment of the invention, the outer rotor construction comprises an air-gap adjusting means to adjust the position of a rotor housing segment relative to an air-gap of the generator. The segmented construction makes it favorably easy to correct air-gap unevenness by adjusting the position of one or more rotor housing sections. For example, the air-gap adjusting means can comprise one or more shims placed between a rotor housing section at the drive end and/or non-drive end of the rotor. A shim can be a thin, flat piece of sheet metal, for example. A default number of shims, for example one or two, may be initially put into place at each end of each rotor housing section. Later, the positions of one or more rotor housing sections can be adjusted by removing one or more shims, or by adding one or more shims, as necessary. Each shim can be prepared to include an opening through which a fastener can be passed, so that a fastener joining a rotor housing section to a front plate or back plate will also securely hold the shim in place. In this way, the overall air-gap is "broken down" into a plurality of air-gaps per pole, whereby the number of individual air-gap portions corresponds to the number of rotor housing sections. Each individual air-gap portion can be adjusted independently of the others, with the aim of obtaining an even and uniform air-gap between the stator and the rotor.

The segmented design of the outer rotor makes it relatively simple to access a defective part of the generator, since a rotor housing segment can be removed by simply removing the relevant fasteners and lifting the rotor housing segment out. Since a rotor housing segment carries a magnet pole, it will be quite heavy. Furthermore, handling the permanent magnets can be hazardous. Therefore, in a further preferred embodiment of the invention, a wind turbine comprises a crane arranged in a canopy of the wind turbine, which crane is realized for lifting and lowering a rotor housing section of the outer rotor during a maintenance procedure. Such a crane need only be large enough to reach the outer rotor and to lift and maneuver a rotor housing segment with its magnet pole. The crane can be permanently installed in the canopy, and can be realized to extend and retract as appropriate. The crane can be realized to be operated manually or by remote control.

A maintenance step for the outer rotor according to embodiments of the invention can be as described above, with the steps of detaching a rotor housing section and lifting it out of the outer rotor (leaving a gap). Preferably, the method according to embodiments of the invention comprises servicing the magnet pole of the detached rotor housing section if this is possible. For example, if only one of the magnet pole pieces is defective, it may be sufficient to just replace the defective magnet pole piece. Then, the rotor housing section can be lowered back into place and secured, for example be re-inserting the fasteners and tightening these again.

BRIEF DESCRIPTION

Some of the embodiments will be described in detail, with reference to the following figures, wherein like designations denote like members, wherein:

FIG. 1 shows a cross-section through a generator with an embodiment of an outer rotor construction;

FIG. 2 shows a pair of adjacent rotor housing sections in a further embodiment of an outer rotor construction;

FIG. 3 shows an embodiment of a mated lateral connection between the rotor housing sections of FIG. 2;

In the diagrams, like numbers refer to like objects throughout. Objects in the diagrams are not necessarily drawn to scale.

DETAILED DESCRIPTION

Figure 4:
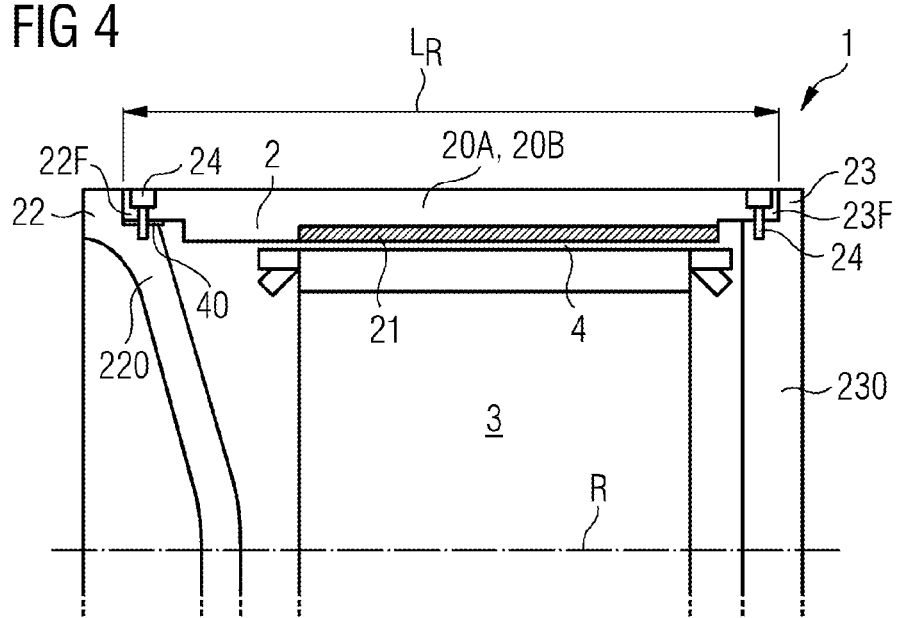
FIG. 4 shows a further cross-section through a generator with an embodiment of an outer rotor construction.

FIG. 1 shows a cross-section through a generator 1 with an embodiment of an outer rotor construction 2 according to embodiments of the invention. The diagram shows that the outer rotor construction 2 comprises a plurality of rotor housing sections 20A, 20B that closely fit together. An enlarged view of several adjacent rotor housing sections 20A, 20B is shown in the lower part of the diagram. A structurally stable construction is achieved by alternating flange arrangements. A first rotor housing section 20A has a pair of outer flanges 200A, i.e. flanges that form part of the outer surface of the rotor 2. A second rotor housing section 20B has a pair of inner flanges 200B, i.e. flanges that form part of the inner surface of the rotor 2. A mated lateral connection 200 is formed by a pair of adjacent complementary flanges 200A, 200B as will be explained in FIGS. 2 and 3. Each rotor housing section 20A, 20B is machined to accommodate a magnet pole, which comprises a number of magnet pole pieces 210, each mounted on a base plate 211. Here, each rotor housing section 20A, 20B has a T-shaped slot to accommodate a flat base plate 211. The magnets 210 protrude inwards and face the stator teeth 30 and the windings 31 of the generator 3 across the narrow air-gap 4.

FIG. 2 shows a cross-section through a pair of adjacent rotor housing sections 20A, 20B in a further embodiment of an outer rotor construction according to embodiments of the invention. Here, the diagram shows the rotor housing sections 20A, 20B before these are assembled. In this exemplary embodiment, a dovetail slot 25 is formed in each rotor housing section 20A, 20B for holding a magnet pole arrangement (not shown). The diagram shows lateral flanges 200A, 200B which can be joined later by fasteners inserted through corresponding bushings 240. These can be threaded to match the thread of a fastener such as a construction bolt. The combined depth of two corresponding bores is such that a fastener will not protrude beyond the inner surface 26 and the outer surface 27 of the rotor. FIG. 3 shows an embodiment of a mated connection 200 between the rotor housing sections of FIG. 2, after these have been secured together. The diagram shows the overall countersunk threaded bore 240 in the flanges 200A, 200B to accommodate a socket-head bolt 24. The length of the bolt 24 is less than the thickness of the rotor housing $d_R$, so that the mated connection 200 is achieved without any part extending beyond the inner surface 26 and the outer surface 27 of the rotor as explained above. In such a realization, the threaded bore 240 in the rotor housing section 20B with inner flanges 200B may extend only partway into the flange 200B, as shown in FIG. 3.

FIG. 4 shows a further cross-section through a generator 1 with an embodiment of an outer rotor construction 2 according to embodiments of the invention. The diagram shows the arrangement of the inner stator 3 and the outer rotor 2 about the generator's axis of rotation R, and a rotor housing section 20A, 20B (it can be either type) extending between a front plate 220 and a back plate 230 of the generator 1. To connect the rotor housing sections to these plates 220, 230, each rotor housing section 20A, 20B has a flange portion at each end, so that a front or anterior flange 22F can be secured to the front plate 220 at a front end 22 of the generator 1, and a rear or posterior flange 23F can be secured to the back plate 230 at a rear end 23 of the generator 1. These flanges 22F, 23F are secured in this exemplary embodiment using fasteners 24 such as the socket-head bolts 24 described above.

In the exemplary embodiment shown, an air-gap adjustment shim 40 is shown between the front plate 220 and the front-end flange 22F. The height of the shim 40 is chosen to correct an inconsistency in the air-gap 4 (previously determined by some suitable measuring technique). Any number of such shims 40 can be placed under the front end flanges 22F or the rear end flanges 23F as required. These can also be removed fairly easily at a later date should they no longer be required.

Figure 5:
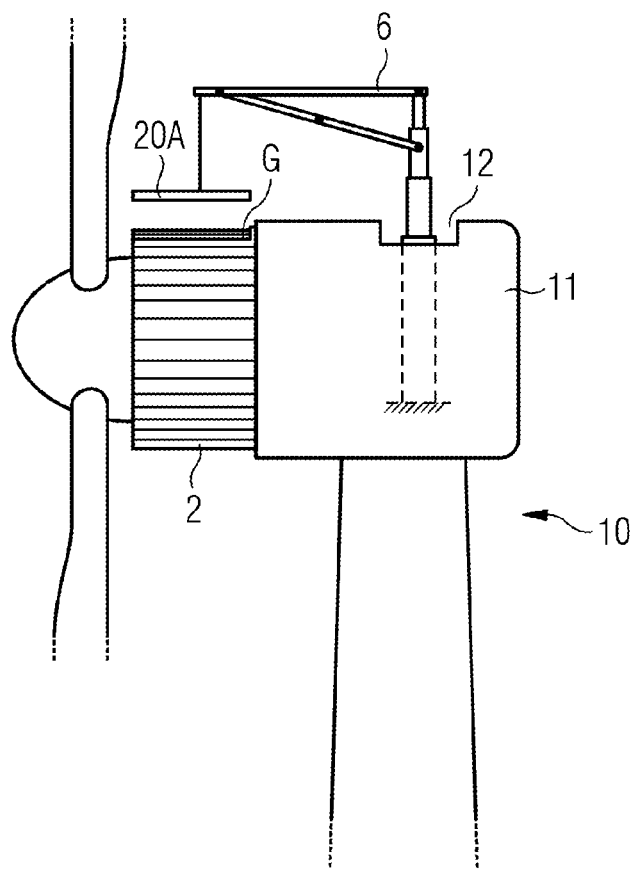
FIG. 5 shows a wind turbine according to an embodiment of the invention.

FIG. 5 shows a wind turbine 10 according to an embodiment of the invention. Here, the outer rotor construction 2 can be seen during a maintenance procedure. The generator is halted, and a crane 6 has been extended through a hatch 12 in the canopy 11 of the wind turbine 10. Service technicians (not shown) have released the fasteners of a rotor housing section 20A, and the crane 6 has lifted this section 20A out of the outer rotor 2, leaving a gap G. If this is the defective rotor housing section 20A, it can be repaired, or replaced with a rotor housing section 20A of the same type. The defective rotor housing section may be one with inner flanges, adjacent to the one previously removed. In that case, two rotor housing sections would be removed and replaced during the maintenance procedure in order to access the defective one.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An outer rotor construction for a wind turbine generator, which outer rotor construction comprises a plurality of rotor housing segments, wherein a rotor housing segment is realized to hold a number of magnet poles, and wherein a rotor housing segment comprises a lateral connecting interface of a lateral connection for detachably connecting that rotor housing segment along its longitudinal length to a number of adjacent rotor housing segments.

2. The outer rotor construction according to claim 1, wherein the lateral connecting interface is realized to form a mated lateral connection between a first rotor housing segment and an adjacent second rotor housing segment.

3. The outer rotor construction according to claim 1, wherein the lateral connection comprises an outer flange of the first rotor housing segment and an inner flange of the second rotor housing segment comprises.

4. The outer rotor construction according to claim 3, wherein a flange extends along the length of a rotor housing segment.

5. The outer rotor construction according to claim 1, wherein a lateral connection comprises a plurality of fasteners realized to secure a rotor housing segment to an adjacent rotor housing segment.

6. The outer rotor construction according to claim 1, wherein a rotor housing segment is aligned with the axis of rotation of the generator.

7. The outer rotor construction according to claim 1, wherein a rotor housing segment comprises a pole holding means for holding one or more magnet pole arrangements.

8. The outer rotor construction according to claim 1, comprising at least 100 rotor housing sections.

9. The outer rotor construction according to claim 1, comprising an air-gap adjusting means to adjust the position of a rotor housing segment relative to an air-gap of the generator.

10. The outer rotor construction according to claim 1, wherein a rotor housing segment comprises a front plate connecting interface between a rotor housing segment and a rotor front plate, and/or a back plate connecting interface between that rotor housing segment and a rotor back plate.

11. The outer rotor construction according to claim 1, wherein a connecting interface comprises a seal realized to prevent moisture from passing the connecting interface.

12. The wind turbine comprising a generator, which generator comprises an inner stator and an outer rotor according to claim 1.

13. The wind turbine according to claim 12, comprising a crane arranged in a canopy of the wind turbine, which crane is realized for lifting and lowering a rotor housing segment of the outer rotor construction during a maintenance procedure.

14. The method of performing a maintenance procedure on an outer rotor construction according to claim 1, which method comprises the steps of
   detaching a rotor housing section from its adjacent rotor housing sections;
   lifting the detached rotor housing section out of the outer rotor to leave a gap;
   lowering a replacement rotor housing section into the gap; and
   securing the replacement rotor housing section to the adjacent rotor housing sections.

15. The method according to claim 14, comprising the step of servicing the magnet pole of the detached rotor housing section.

16. The outer rotor construction according to claim 1, comprising at least 120 rotor housing sections.

17. The outer rotor construction according to claim 1, comprising at least 140 rotor housing sections.

\* \* \* \* \*